US008634849B2

(12) United States Patent
Jovicic et al.

(10) Patent No.: US 8,634,849 B2
(45) Date of Patent: Jan. 21, 2014

(54) METHODS AND APPARATUS FOR MOBILE DEVICE BASED LOCATION DETERMINATION IN A COMMUNICATIONS SYSTEM

(75) Inventors: Aleksandar Jovicic, Jersey City, NJ (US); Cyril Measson, Somerville, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 13/009,793

(22) Filed: Jan. 19, 2011

(65) Prior Publication Data

US 2012/0184287 A1 Jul. 19, 2012

(51) Int. Cl.
*H04W 24/00* (2009.01)

(52) U.S. Cl.
USPC .................. 455/456.1; 455/456.5; 455/456.3; 455/456.4; 455/456.6; 455/457

(58) Field of Classification Search
USPC .......... 455/456.1, 456.3, 456.4, 456.5, 456.6, 455/457
See application file for complete search history.

(56) References Cited

U.S. PATENT DOCUMENTS

| | | | |
|---|---|---|---|
| 7,031,725 B2 * | 4/2006 | Rorabaugh ................. | 455/456.1 |
| 7,072,671 B2 * | 7/2006 | Leitch ........................ | 455/456.1 |
| 7,084,809 B2 * | 8/2006 | Hockley et al. ........... | 342/357.48 |
| 7,277,049 B2 * | 10/2007 | Korneluk et al. ......... | 342/357.42 |
| 2006/0267841 A1 | 11/2006 | Lee et al. | |
| 2008/0254808 A1 | 10/2008 | Rekimoto | |
| 2010/0151789 A1 | 6/2010 | Suzuki et al. | |
| 2012/0057646 A1 * | 3/2012 | Jovicic et al. ............. | 375/295 |

OTHER PUBLICATIONS

Kang, GuoDong, et al., "An opportunistic indoors positioning scheme based on estimated positions" Proceedings of the IEEE Symposium on Computers and Communications—ISCC'09, Jul. 5-8, 2009, pp. 844-850.
N. Patwari, et al., "Relative location in wireless networks," in IEEE VTC, vol. 2, May 2001, pp. 1149-1153.
International Search Report and Written Opinion—PCT/US2012/021604—ISA/EPO—May 15, 2012.

* cited by examiner

*Primary Examiner* — Kamran Afshar
*Assistant Examiner* — Shahriar Behnamian
(74) *Attorney, Agent, or Firm* — James K. O'Hare (57) ABSTRACT

Methods and apparatus related to determining location of mobile devices based on signals and/or location history information received from other mobile devices are described. In various embodiments mobile devices monitor signals from other devices. Mobile devices store signal measurement information along with time stamp information and information identifying the device from which a measured signal was received. In various embodiments a mobile communications device which determines its location with reasonable accuracy, e.g., to within a predetermined distance or some other accuracy metric, transmits location history information indicating one or more past locations, and optionally the device's current location, and the times it was at the indicated locations. Reliability information is communicated with the time and location information in some embodiments. A device receiving the location history log can determine and/or refine its understanding of its own location and the location of other devices at different points in time.

14 Claims, 7 Drawing Sheets

METHODS AND APPARATUS FOR MOBILE DEVICE BASED LOCATION DETERMINATION IN A COMMUNICATIONS SYSTEM

FIELD

Various embodiments relate to wireless communications, and more particularly, to methods and apparatus for determining mobile device location in a communications system.

BACKGROUND

Determination of a device's location is useful in supporting a wide variety of location based services and/or applications. To facilitate use of such services and applications it is desirable that a device be able to determine its location with a reasonable degree of accuracy.

While global positioning system (GPS) devices may be used for location determination, in many locations, e.g., inside buildings, outside between large buildings, and in other locations where reception of satellite transmitted GPS signals is difficult, GPS may not be a viable location determination mechanism.

The measurement of signals from access points positioned at fixed known locations may be used in some systems as a basis for determining location. Unfortunately, fixed access points may not be located in enough locations to be used reliably for location determination purposes at all times.

While it is useful for a device to know its location reliably at various points in time, e.g., for map based navigation applications, for social applications it is often useful to know the location of peer devices with which a user of a device may want to interact, e.g., for one or more social reasons.

In view of the above discussion, it should be appreciated that there is a need for improved location determination methods which could be used to determine a device's location even when GPS signals may not be received. In addition, while not necessary or used for all embodiments, it would be desirable if location determination methods could provide information on the location of other wireless devices, e.g., peer devices, in addition to the location of the device

SUMMARY

Methods and apparatus related to determining location of mobile devices based on signals and/or location history information received from other mobile devices in a communications system are described.

In various embodiments mobile devices monitor signals, e.g., peer discovery signals, from other devices. The other devices may, and in various embodiments do, include mobile devices. In addition to monitoring for signals from mobile devices, a mobile device monitors for signals from anchor points, e.g., fixed access points. The mobile device implementing the method, in one embodiment, stores signal measurement information along with time stamp information and information identifying the device from which a measured signal was received. For example, the stored information may indicate for each of a plurality of different points in time, a received signal measurement such as a power or frequency measurement, and information identifying the source of the signal which was measured. For example for each detected peer device, the strength of the signal received may be recorded along with the time of the signal measurement. Similar information may be stored for signals received from anchor points. Thus, a log or record of signal measurements is developed over time with information identifying the devices to which the measured signals correspond. To the extent that it is available, information about the location of the measuring device's location at the time of the signal measurement may also be stored. Information about the accuracy of the location information indicating the location of the measuring device may also be stored for each point in time for which location measurement information is stored.

In various embodiments a mobile communications device which determines its location, e.g., to within a predetermined distance or some other accuracy metric, transmits location history information indicating one or more past locations and the times it was at the past locations. The location history information may optionally also include the current location of the transmitting device. The transmitted information may, and in many embodiments does, indicate the location of the transmitting device at different times. In some but not all embodiments associated with one or more communicated sets of time and location information is a reliability indicator, e.g., indicating the believed accuracy of the location(s) indicated by the provided location history information. In some embodiments in addition to transmitting information about its own location at different times, a mobile device transmitting location history information may also transmit its understanding of the location of other devices at different times and/or signal measurements corresponding to received signals measured at different times. Sufficient information is communicated with the signal measurement information to allow a receiving device to determine, e.g., based on a peer identifier associated with the signal measurement information, the device which transmitted the signal to which a communicated signal measurement corresponds.

Mobile devices in the system monitor for transmitted location history information as well as other signals. Measurements of received signals are used alone and/or in combination with received location history information to determine a mobile device's location. While a device may be able to accurately determine its location from a signal received from a fixed anchor point at some points in time, at other points in time it uses signals received from other mobile devices in combination with received location history information to accurately determine the device's location. In addition, in some embodiments the mobile device also determines the location of other devices from the received signals and/or the received location history information.

By communicating location history information and using such information mobile devices are able to determine their location at different points in time with a fair degree of accuracy as well as the location of other devices in an area. In addition, in many cases, it is possible not only to determine a device's location at a particular point in time but a device's location at multiple different points in time. Thus a device is able to not only determine and/or trace its own path through an area at a given time but also the path of other devices in an area. In addition, predictions of the future location of peer devices may, and in some embodiments are made based on location and/or location history information which is generated, received and/or communicated in the system.

Transmission of location history information may be suppressed until the location information is determined to be sufficiently accurate to merit its transmission and potential use by other devices. Transmission of location history information may be a function of device power availability, e.g., the frequency of such transmissions by an individual device are controlled to diminish as a mobile devices battery reserves diminish and/or as the number of location history information reports from other devices is received. In this manner, a device can conserve power as needed, e.g., stopping transmission of location history reports or reducing the frequency of the transmission of such reports when remaining power is below a threshold. In addition the number, rate and/or amount of information included in transmitted location history reports is reduced in some embodiments as the number and/or rate of location history reports received within a predetermined period of time increases and/or exceeds a predetermined threshold. Thus, in some embodiments transmission of an excessive number of location history reports in a system is avoided in areas where a large number of devices have already determined their location and the transmission of frequent location history reports adds little to the reports already being transmitted. In some embodiments location history reports are transmitted in response to a signal or signals from a peer device indicating it is seeking assistance in a location determination. Thus in at least some embodiments, the rate, number and/or amount of information included in transmitted location history reports is dynamically varied based on received signals, e.g., location history reports received from other devices and/or requests for location history information and/or a request for assistance in determining a device's location.

A first communications mobile device receiving peer location history information, e.g., transmitted by a second mobile device which determines its location with reasonable accuracy, matches the peer location history information corresponding to the second mobile communications device with the signal measurement and time information stored in its memory corresponding to the signals received from the second communications device. The first mobile communications device receiving the peer location history information then uses the received location history information and stored signal measurement information to determine its own current location and/or refine its own location history which it internally maintains. Upon achieving a predetermined level of accuracy regarding its own location and location history, the first mobile communications device, like the second mobile communications device, transmits its location history information to be used by other mobile devices in determining their location and historical path of travel.

Thus in at least some embodiments, through the use of stored signal measurement information corresponding to measurement of signals received from other mobile devices used in combination with location history information received from other mobile devices, a mobile devices path over time can be generated and the mobile device's current location can be determined and/or refined even in the absence of a location anchor point in the vicinity of the mobile device.

An exemplary method of operating a first mobile communications device, in accordance with some embodiments, comprises: receiving a location history log from a second mobile communications device including location related information corresponding to at least one point in time, said location related information including at least one of: i) information indicating the location of the second mobile communications device at said at least one point in time or ii) the result of signal measurement of a signal received from another device at said at least one point in time; and determining information about the location of the first mobile communications device from the received location history log and stored signal measurement information corresponding to signals received from the second mobile communications device.

An exemplary first mobile communications device, in accordance with some embodiments, comprises: at least one processor configured to: receive a location history log from a second mobile communications device including location related information corresponding to at least one point in time, said location related information including at least one of: i) information indicating the location of the second mobile communications device at said at least one point in time or ii) the result of signal measurement of a signal received from another device at said at least one point in time; and determine information about the location of the first mobile communications device from the received location history log and stored signal measurement information corresponding to signals received from the second mobile communications device. The exemplary first mobile communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
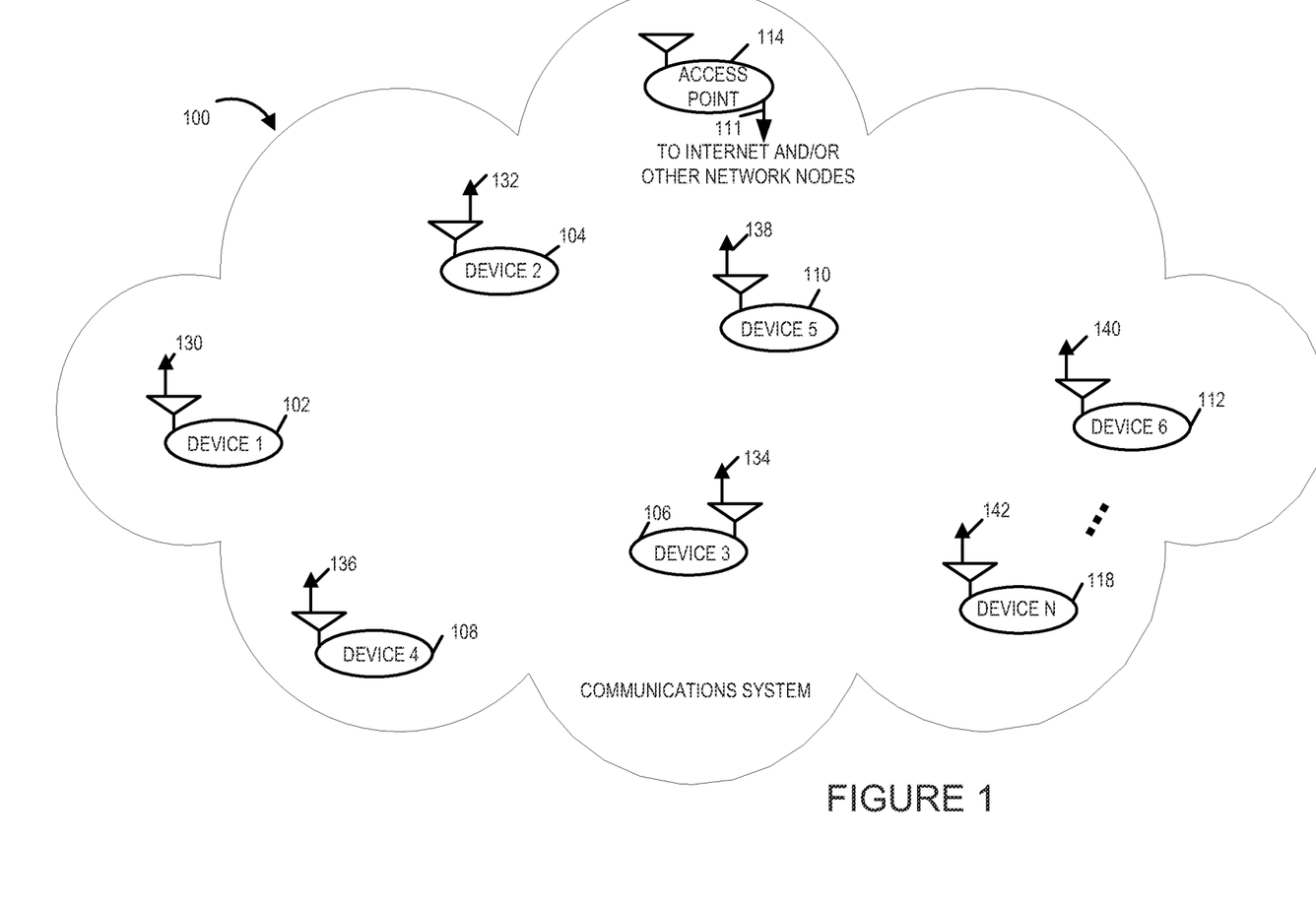
FIG. 1 is a drawing of an exemplary wireless communications system, e.g., peer to peer wireless communications system, in accordance with an exemplary embodiment.

FIG. 1 is a drawing of an exemplary wireless communication system 100, e.g., a peer to peer communications system, in accordance with an exemplary embodiment. Exemplary wireless communications system 100 includes a plurality of wireless mobile communications devices, e.g., peer to peer devices, including mobile device 1 102, mobile device 2 104, mobile device 3 106, mobile device 4 108, mobile device 5 110, mobile device 6 112, ..., mobile device N 118. The communications system 100 also includes one or more access points (APs), e.g., base stations, such as access point 114. The access point 114 in some embodiments, is a fixed location device and include a wireless interface which supports peer to peer signaling protocol in addition to other wireless signaling protocols, and a wired interface providing coupling to a backhaul network. The access point 114 is sometimes also referred to as an anchor point or location anchor point. The AP 114 may communicate with various mobile communications devices in the system, e.g., via a wireless link and may transmit its location or its location may be known to the wireless terminals. The AP 114 provides access to the Internet and/or other network nodes, via a wired or fiber network connection 111. Thus via AP 114, information may be communicated to one or more wireless communications devices via wireless links. Various other wireless communications devices in system 100, e.g., device 1 102, device 2 104, device 3 106, device 4 108, device 5 110, device 6 112 and device N 118, are mobile wireless devices, e.g., handheld mobile devices. The mobile wireless communications devices support peer to peer communications, e.g., mobile wireless communications devices may communicate directly without having to communicate through another device such as access point 114.

Communications devices in system 100 may transmit and receive signals, e.g., peer discovery signals, paging signals and/or traffic data signals to/from one or more of other communications devices in the system. For the purpose of illustration, mobile communications devices 102, 104, 106, 108, 110, 112, . . . , 118 are shown as transmitting signals 130, 132, 134, 136, 138, . . . , 142 respectively. In some but not necessarily in all embodiments, signals 130, 132, 134, 136, 138, . . . , 140 are peer discovery signals transmitted at a known power level during a peer discovery time interval. In accordance with one aspect, one or more devices in system 100, e.g., first mobile communications device 1 102, receive signals from other communications devices in the system, e.g., from second mobile communications device 2 104, over different points in time; measures a signal characteristic of the received signals and stores the signal measurements along with information identifying the source of signals. In various embodiments the first mobile device 1 102 further receives a location history information, e.g., a location history log from the second mobile device 2 104 including location related information corresponding to one or more points in time. Using the received location history log and the stored signal measurement information corresponding to signals received from the second mobile device 2 104, the first mobile device 1 102 determines information about its own location. It may also determine the location of other devices in the area and their path over time. From their previous path it may, and in some embodiments do, infer or predict where one or more other mobile devices will be in the future.

Figure 2:
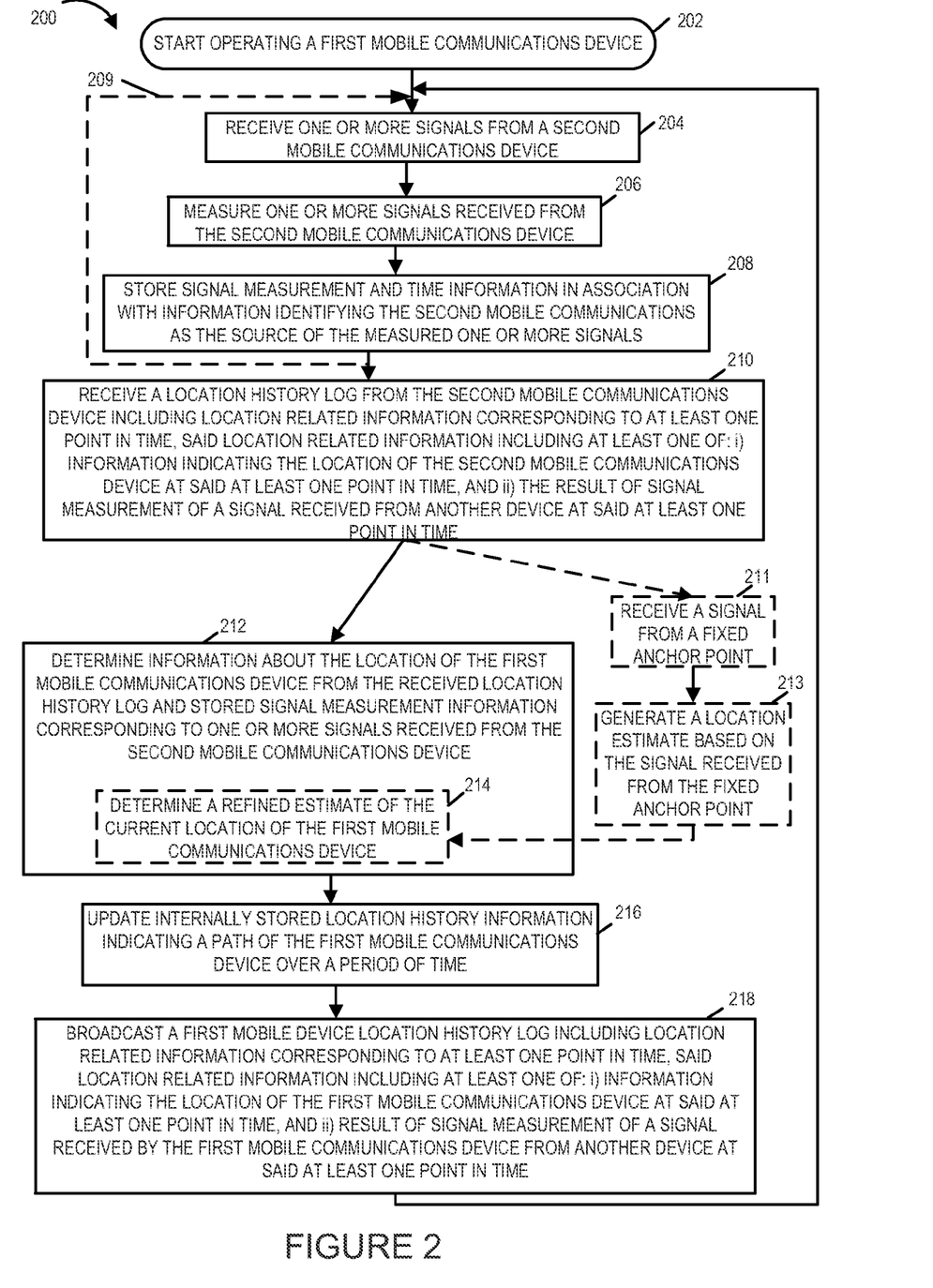
FIG. 2 is a flowchart of an exemplary method of operating a mobile communications device in accordance with an exemplary embodiment.

FIG. 2 is a flowchart 200 of an exemplary method of operating a mobile communications device, in accordance with an exemplary embodiment. The mobile communications device implementing the method of flowchart 200 is, e.g., any one of the wireless mobile communications devices of system 100 of FIG. 1. For the purpose of illustration, we will consider that the steps shown in the exemplary method of flowchart 200 as being implemented by the first mobile communications device 1 102. As will be discussed, in accordance with one feature of various embodiments, the first mobile communications device 1 102 determines information about its own location based on received signals and, in some cases, a received location history log received from another communications device, e.g., a second mobile communications device. The received log information and stored signal measurement information corresponding to signals received from the second mobile communications device and/or other devices is used to determine and/or refine the first device's understanding of its current location as well as past locations.

The method shown in FIG. 2 starts in step 202, with the first device 1 102 being powered on and initialized. Operation proceeds from start step 202 to step 204.

In step 204 the first device 1 102 receives one or more signals from a second mobile communications device, e.g., mobile device 2 104. The received one or more signals are measured in step 206 and the corresponding signal measurement information is stored in step 208. The process of steps 204, 206 and 208 are performed, e.g., repeatedly over a period of time as represented by dashed arrow 209 with operation proceeding at the end of said period of time to the next step. Thus it should be appreciated that signals may be, and sometimes are, received over a period of time with, in some cases, each measured signal from a particular device corresponding to a different point in time.

The signals received in step 204 maybe, e.g., peer discovery signals. It should be appreciated that the second mobile communication device could be any one of the peer mobile communications devices of system 100. However for the purpose of explaining FIG. 2, we will consider device 2 104 to be the second mobile communications device. The received signals may be the signals which are normally transmitted by the second mobile device 2 104 as part of normal operation. The signals maybe, e.g., peer discovery signals, traffic, paging signals, timing signals, etc. In some embodiments the received signals are dedicated positioning signals, e.g., signals communicating device location information and/or for making estimates of the receiving devices range from the transmitting device. The signals which are measured may, but need not be, transmitted at a predetermined power level, frequency and or having other signal characteristics at the transmitter known to the receiving device facilitating their use as reference signals. It should be appreciated that first mobile device 1 102 may receive signals from other peer devices in addition to device 2 104. In some embodiments the received signals include a unique device identifier or at least a portion of a device identifier identifying the source of the signals, i.e., the transmitting device. In addition or alternatively, the signals may be transmitted in dedicated time slots or using resources know to correspond to a particular device allowing the receiving device to identify the transmitting device. For the purpose of discussion of flowchart 200 we will consider that the received signals on which measurements are performed are peer discovery signals.

In step 206 the first mobile device 1 102 measures a signal characteristic of the received one or more signals. In some embodiments multiple signal characteristics are measured. In some embodiments the measured signal characteristics include one or more of received signal power, frequency and multi-path delay spread. Thus when the first mobile device 1 102 receives peer discovery signals, it measures, e.g., signal power level and/or other signal characteristics, of each the received peer discovery signals and associates the signal measurements with information identifying the device which transmitted the signal.

In step 208 where the first mobile device 1 102 stores, e.g., in a memory, signal measurement and time information in association with information identifying the second mobile device 2 104 as the source of measured signal or signals. The time information is, in some embodiments, e.g., one or more time stamps indicating the time of signal measurement(s). The time-stamps may be relative to a local notion of time shared by the communications devices in the system 100 or a global time obtained from a timing source such as a satellite or other broadcast transmission source. Since the time associated with the measurement(s) are based on a common timing source, the devices, at least in the local area, can use the time stamps to correlate signal measurements made at different devices over a period of time.

It should be appreciated that although discussed with regard to the second mobile device 2 104, in various embodiments the first device 1 102 also stores signal measurement information corresponding to signals received from various other devices, e.g., mobile devices, in the system. In some embodiments the information identifying the second mobile device 2 104 as the source of measured signal, is e.g., peer device identifier or some other identifier.

In accordance with one aspect, the first mobile device 1 102 stores the signal measurement information over a period of time along with the time information indicating the time of the indicated measurements to build up a log of historical signal measurements corresponding to signals received from the second mobile device 2 104 at different points in time. Signal measurement information for other devices is also stored with time and device identifier information. Thus the log may include signal measurements corresponding to multiple devices made at different times and potentially different locations as the first device moves over time. As will be discussed, the stored historical signal measurement information corresponding to one or more devices is used in various embodiments to determine the location information about the first mobile communications device 1 102 implementing the method of flowchart 200. It can, and in some embodiments is, also used to determine the location of the other devices in the area from which signals were received. Thus, the first mobile communications device 1 102 can determine a map of the various devices in the system and where they were at different points in time.

Operation proceeds from step 208 to step 210. In step 210 the mobile device 1 102 receives a location history log from the second mobile communications device 2 104 including location related information corresponding to at least one point in time, but in many cases multiple points in time, said location related information including at least one of: i) information indicating the location of the second mobile communications device 2 104 at said at least one point in time or ii) the result of signal measurement of a signal received from another device at said at least one point in time.

In some embodiments the location history log includes related information corresponding to multiple different points in time and corresponding location related information of one or more mobile communications devices at said multiple points in time and/or the results of signal measurements of multiple signals received from other devices at different points in time.

Figure 6:
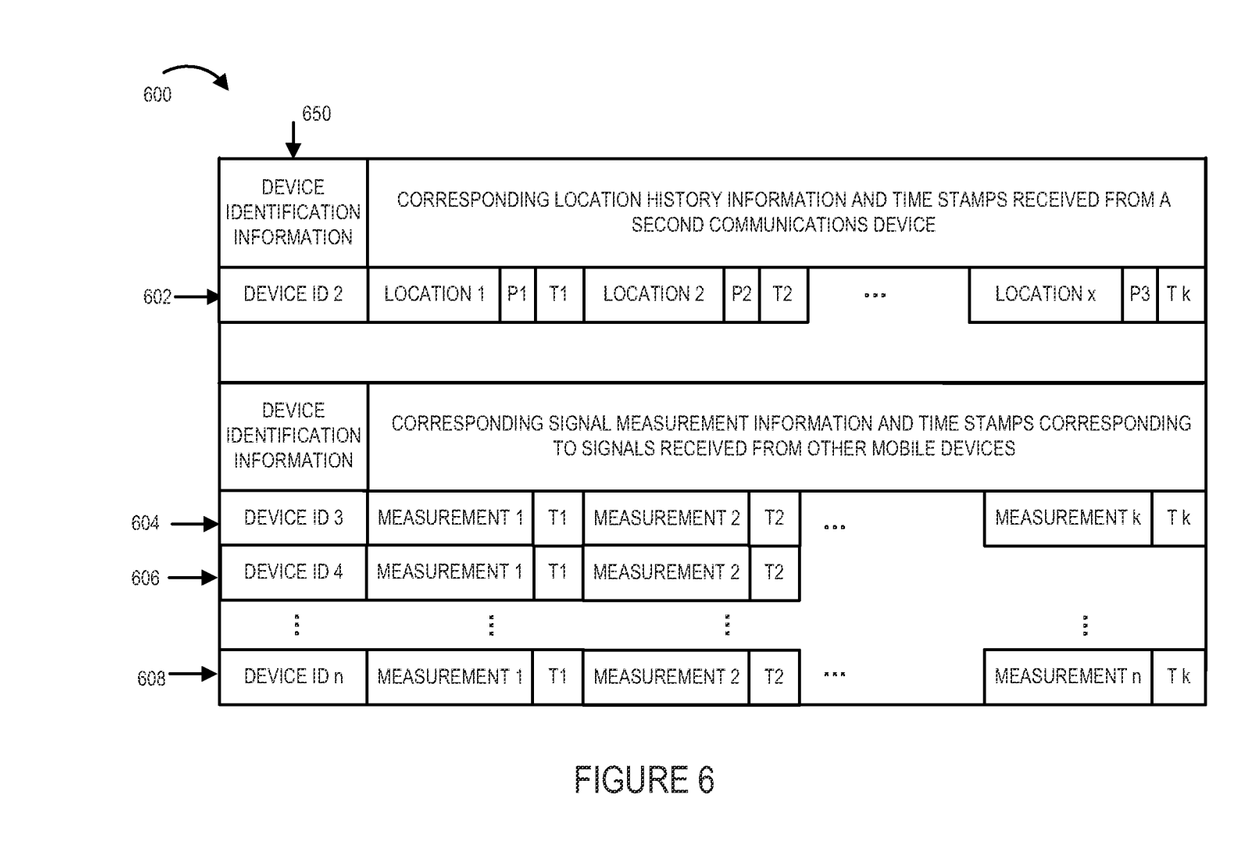
FIG. 6 illustrates an exemplary location history log received by the first mobile communications device from a second mobile communications device, in accordance with one exemplary embodiment.

In some embodiments the received log includes both types of information. An exemplary location history log including the location related information received from the second mobile device 2 104 is shown in FIG. 6 example and will be discussed in greater detail later. In some embodiments the information indicating the location of the second mobile communication device 2 104 is a set of possible locations and a set of probability values, each probability value in the set of probability values corresponding to one of the possible locations in the set of possible locations. The possible location and corresponding probability values may be included as possible location/probability value pairs. In some embodiments, each probability value indicates the accuracy level of the corresponding possible location of the second mobile device 2 104 in the set of possible locations, to which the probability value corresponds.

In some embodiments the location history log is sent in a single transmission from the second mobile device 2 104 to the first mobile device 1 102. In some other embodiments the transmission of the location history log is a broadcast transmission not addressed to a specific mobile communications device. Thus in some embodiments a plurality of mobile communications devices in the system including the first mobile device 1 102 which are in the broadcast transmission coverage area of the second mobile device 2 104, may receive the location history log including information corresponding to one or more points in time.

In accordance with one feature of various embodiments, the stored historical signal measurements corresponding to signals received by the first device 1 102 from the second mobile device 2 104, e.g., received at different points in time, and the received location history log from the second device 2 104, provides sufficient information to the first mobile device 1 102 to determine information about the location of the first mobile device 1 102. In some embodiments the second mobile device 2 104 transmits the location history log to the first mobile device 1 102 after determining its own location with reasonable accuracy, e.g., within a predetermined distance. Thus, the first device 1 102 is secure in relying on the received location history log. In some embodiments a reliability indicator, e.g., such as a probability value, is included with each location indicated in the log. In such an embodiment the first device 1 102 can thus determine the degree to which a particular indicated location can be trusted and/or relied upon in determining its own location. Location information which is indicated to be less reliable, e.g., with lower probability, than the first device's current understanding of its own location and/or the location of the second device 2 104 may, and in some embodiments are, disregarded by the first device 1 102 when refining an already existing understanding of the first device's location.

In some embodiments the first mobile device 1 102 measures the signals transmitted by the second mobile device 2 104 which may not know its current or past positions. The signal characteristics which are measured are sometimes referred to as "fingerprints". When the second mobile device 2 104 obtains an estimate of its own position history, which includes past positions with the associated time-stamps, the second mobile device 2 104 either broadcasts this location history log or directly transmits the information to the first mobile device 1 102.

Operation proceeds from step 210 to step 212. In step 212 the first mobile communications device 1 102 determines information about the location of the first mobile communications device from the received location history log and stored signal measurement information corresponding to one or more signals received from the second mobile communications device 2 104. In some embodiments, in step 212 the first mobile device 1 102 computes its current and/or past positions based on the sequence of past fingerprint measurements of the signals transmitted by the second mobile device 2 104, and the received position history of the second mobile device 2 104. The computing of the first device's location may be a refinement and/or updating of the first devices understanding of its location at the time the location determination based on the received log information is made. In some embodiments, in calculating its current or past positions, the first mobile device 1 102 uses a set of fingerprint prediction maps corresponding to past positions of the second mobile device 2 104. Thus, using the received location history log from the second mobile communications device 2 104, and the signal measurement information corresponding to signal(s) received from the second mobile device 2 104 at one or more points in time, which the first device 1 102 stores internally, the first mobile device 1 102 determines its own location, e.g., at the present time. The information can also be used to update and/or determine the location of the first device 1, 102 at past points in time allowing the mobile device 1 102 to refine its understanding of the path it has traveled. In various embodiments the determined information about the location of the first mobile communications device 1 102 includes information about at least one of: the current location of the first mobile communications device 1 102, or a past location of the first mobile communications device 1 102. With the generation of each location determination the first communications device 1 102 may also generate a accuracy indicator, e.g., a value indicating how accurate the location determination is. This may be expressed in terms of a distance metric or some other reliability metric. The reliability indicator for a determined location may be stored in memory with the information indicating the determined location and the time the device was at the determined location. In some embodiments the information about the location of the first mobile communication device 1 102 is a set of possible locations and a set of probability values, each probability value in the set of probability values corresponding to one of the possible locations in the set of possible locations. The location and corresponding probability may be stored as a location and probability pair in a set of location probability pairs and/or records. In such an embodiment the probability value associated with a location indicates the accuracy level, and thus reliability, of the corresponding possible location of the first mobile device 102 in the set of possible locations, to which the probability value corresponds.

In some embodiments, operation proceeds from step 210 to step 211 which is optional step and occurs in some embodiments while not in some others. In step 211 the first mobile device 1 102 receives a signal from a fixed anchor point, e.g., such as access point 114. The received signal from the fixed anchor point may be, e.g., a pilot signal that the access points periodically transmits or a location indicator signal that can be used as a location reference. Operation proceeds from optional step 211 to step 213 which is also optional and is performed in embodiments where step 211 is performed. In step 213 the first mobile device 1 102 generates a location estimate using the signal received from the anchor point. It should be appreciated that the fixed location of the anchor point 114 maybe known to the first mobile device 1 102 and thus using the received signal, e.g., using the signal power level of the received signal from the anchor point 114, the first mobile devices 1 102 is able to generate an estimate of its own location. This location determination may be made independent of other signal measurement and/or using measurements of signals received from other devices and received location history log information.

In some such embodiments where steps 211 and 213 are performed, step 212 further includes an optional step 214. In step 214 the first mobile device 1 102 determines a refined estimate of the current location of the first mobile device 1 102, said refined estimate being based on the location estimate generated from the signal received from the fixed anchor point, in addition to said received location history log (received in step 210). Thus it should be appreciated, the first mobile device 1 102 may, and in some embodiments does, perform one or more iterations to determine a more accurate estimate of its location using signals received from mobile devices and fixed anchor points, and using the location related information received from various mobile communications devices such as the second mobile device 2 104. Thus in some embodiments the determined information about the location of the first mobile communications device 1 102 includes a refined estimate of the current location of the first mobile communications device 1 102.

Operation proceeds from step 212 to step 216. In step 216, following the determination of information regarding its location, the first mobile communications device 1 102 updates internally stored location history information indicating a path of the first mobile communications device over a period of time. The first mobile device 1 102 internally maintains a log of its own location history (also called the location history log) which includes record indicating its estimated past locations with the associated time stamps indicating the times the first device 1 102 was at the past locations. The location information along with time stamps indicates the path of the first mobile communications device 1 102 over a period of time. Thus after having its location determined with reasonable accuracy, e.g., as done in steps 212 and 214, the first mobile device 1 102 updates the internally maintained location history information log to refine its own past location estimates so that the location history log corresponding to the first mobile device 1 102 more accurately reflect the location information. The first mobile device 1 102, in some embodiments, also determines the location of devices from which it received signals. Accuracy information may, and in some embodiments is, stored along with the locations of other devices determined for different points in time. This information may be stored and transmitted as part of a location history log along with location history information corresponding to the first device 101. However, where power and/or bandwidth is an issue, the location and/or signal measurements corresponding to other devices may be reduced and/or not transmitted as part of the location history log.

Operation proceeds from step 216 to step 218. In step 218 the first mobile device 1 102 broadcasts the first mobile device's location history log including location related information corresponding to at least one point in time, said location related information includes i) information indicating the location of the first mobile communications device 1 102 at said at least one point in time and/or ii) the result of signal measurement of a signal received by the first mobile communications device 1 102 from another device at said at least one point in time. In some embodiments the location history log includes location related information corresponding to multiple different points in time.

The first mobile device 1 102 may, and in some embodiments does, broadcast the internally stored location history log, e.g., after the location of the first mobile device 1 102 is determined. Thus, after determining its location, e.g., to a certain level of accuracy, the first mobile device 1 102 transmits its location history log information in the same or similar manner to the way the second mobile device 2 104 transmitted its location history information. This allows other mobile devices to hear the broadcast transmission of the location history log from the first mobile device 1 102 and use the location related information included in the location history log in determining their current and/or past locations and/or the locations of other devices in the system. In some embodiments, the first mobile device 1 102 sends first mobile device's location history log as a direct transmission to another mobile communications device. Such a transmission may be in response to a request for assistance in a location determination operation.

As more devices in the system reliably determine their location the number of devices which propagate the location related information which can be used by various mobile devices in the system to determine their own position, will tend to increase over time. This has the advantage of yielding improved accuracy of positioning for the mobile devices in the system as the devices refine and share their location information. Transmission power constraints may, and in some embodiments do, play a role in controlling whether a device transmits its location history and/or the frequency of such transmissions. In some embodiments as a device's battery power decreases, the device reduces the frequency of location history log transmissions or stops them altogether to save power. In some embodiments, the frequency and/or amount of information communicated in location history logs is varied as a function of the number of location history logs being received from other devices in a period of time. As the number of received location history logs increases, the first communications device 102 decreases the amount of information included in the location history log it transmits and/or the frequency of its location history log transmissions. In this manner, as the devices in the system become aware of their locations to a high degree of accuracy, the system is not overwhelmed by the transmission of location history logs from the devices in an area.

In some embodiments the first mobile communications device's location history log is transmitted after determining the location history of the first mobile communications device to a predetermined level of accuracy. The determination regarding the level of accuracy may be made in a variety of ways. For example, when the first mobile device 1 102 uses the received location history log from the second mobile device 2 104 and the stored signal measurements corresponding to signals received from the second mobile device 2 104 in the past, in determining the location information about the first mobile device 1 102, it is understood that the determined location of the first mobile device 1 102 is at least reasonably accurate. This understanding is based on the fact that in accordance with one aspect the mobile devices such as the second mobile device 2 104 transmit their own location history log after ensuring that their location history log is reasonably accurate, e.g., accurate to a predetermined distance. Thus when the first mobile device 1 102 determines its own location using a considerably accurate location history log and signal measurement information or by another means such as GPS or a signal from a fixed location anchor point, it can consider that the determination regarding the location information is reasonably accurate as well. Furthermore in some cases the first mobile device 1 102 may receive location history log from a plurality of devices (e.g., from mobile device 3 106) in addition to the second mobile device 2 104. In such an event, the first mobile device 1 102 may separately determine information about its location using the received location history logs and stored signal measurement information corresponding to each of these different devices. The first mobile device 1 102 may then compare and correlate the individual location information estimates that it determined, to check the accuracy of the location information.

The steps of the location determination process shown in FIG. 2 repeat over time with operation proceeding from step 218 back to step 204 and continuing from their until halted, e.g., due to the communications device being powered off.

Figure 3:
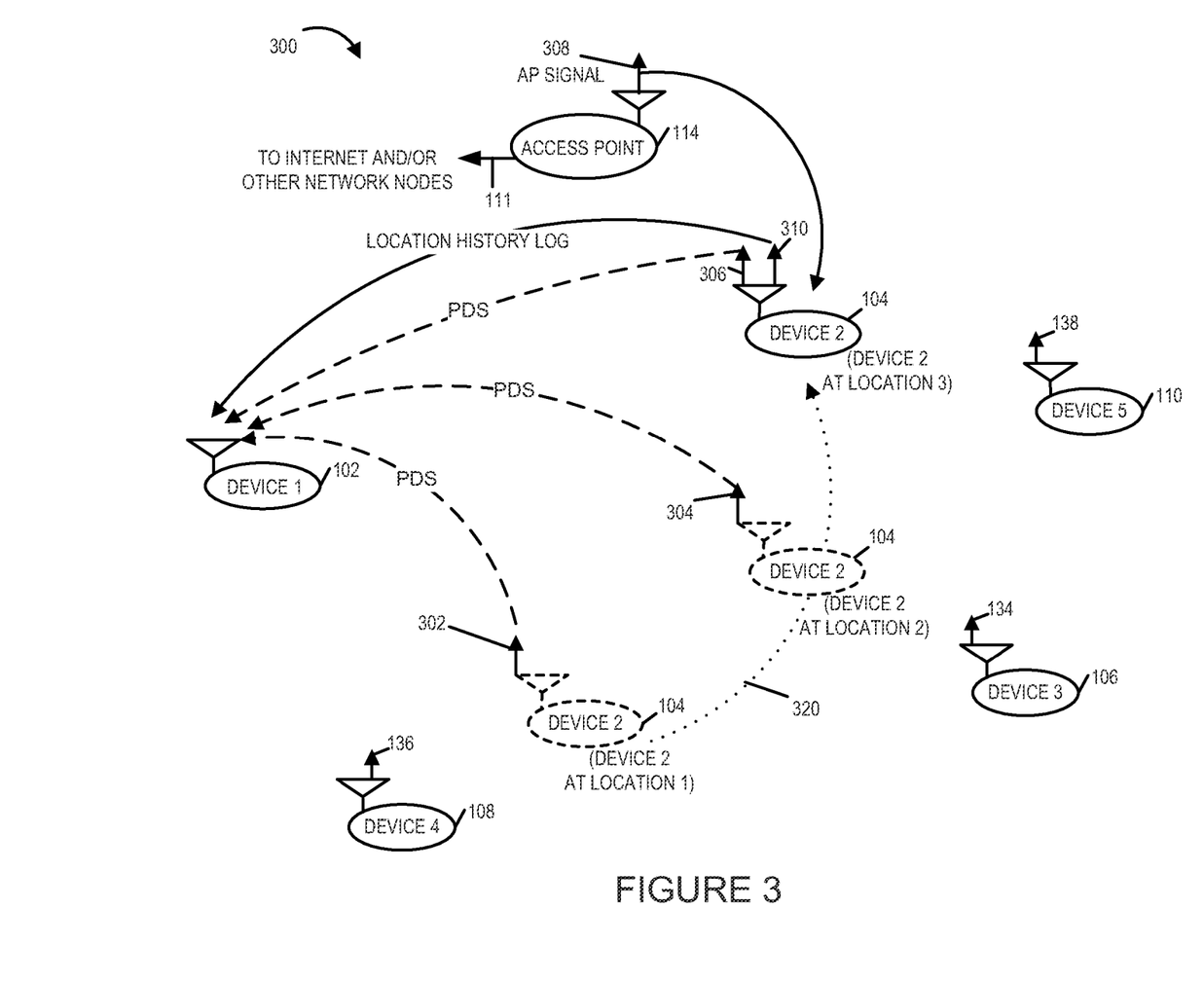
FIG. 3 is a more detailed illustration of a portion of the exemplary wireless communications system of FIG. 1, showing the signaling between various devices in greater detail, in accordance with one exemplary embodiment.

FIG. 3 is a more detailed illustration of a portion of the exemplary wireless communications system of FIG. 1, showing the signaling between various devices in greater detail, in accordance with one exemplary embodiment. FIG. 3 example illustrates a scenario where the first communications device 1 102 receives signals from the second mobile device 2 104 at different points in time while the second mobile device 2 104 is moving from one location to another. Although not shown in the figure, it should be appreciated that the first mobile communications device is not stationary and thus may as well be moving while it receives one or more signals.

In accordance with one feature of various embodiments various mobile communications devices in system 100 such as mobile device 1 102 measure a signal characteristic of the signals received from other devices, and store the signal measurement information in combination with a device identifier identifying the mobile device to which the signal measurement information corresponds and a time stamp indicating the time of signal measurement. In various embodiments the mobile communications device 1 102 further receives location history log including location related information from one or more other mobile communications devices such as mobile device 2 104, e.g., that have determined information about their location and/or are aware of their location history. In some embodiments the mobile communications device 2 104 transmits the location history log after ensuring that the location history included in its location history log satisfies a predetermined level of accuracy. In some such embodiments the accuracy is checked using location estimates generated from signal(s) received from a fixed location anchor point such as AP 114, since anchor points are fixed location devices with known location and thus mobile devices which receive signals from the anchor point can determine more accurate location estimates, e.g., using received signal power level.

In the example of FIG. 3, device 1 102 receives a peer discovery signal (PDS) 302 broadcast by mobile device 2 104 at a point in time when the mobile device 2 104 is, e.g., at location 1. Since the mobile device 2 104 is moving, its location changes with time, however the mobile device 2 104 keeps broadcasting peer discovery signals during its regular operation, e.g., during peer discovery time intervals. Thus as should be appreciated from the figure, the first mobile device 1 102 receives another peer discovery signal 304 from mobile device 2 104 transmitted at a time when the mobile device 2 104 is at location 2. The movement and path of the mobile communications device 2 104 as it moves from location 1 to location 2 and to location 3, is indicated using arrow 320. Mobile communications device 2 104 broadcasts another peer discovery signal 306 when it is at location 3 which is received by the first mobile communications device 1 102. In the FIG. 3 example at each of the locations the mobile communications device 2 104 hears signals from one or more other devices in the vicinity. For example at location 1 the mobile device 2 104 hears a signal 136, e.g., broadcast peer discovery signal, from mobile device 4 108. At location 2 the mobile device 2 104 hears a signal 134 from mobile device 3 106 while at location 3 the mobile device 2 104 hears a signal 138 from mobile device 5 110. In various embodiments the mobile device 2 104 measure these signals and includes the signal measurement information in the location history log corresponding to the mobile device 2 104.

As should be appreciated from the figure, when at location 3 the mobile communications device 2 104 also receives a signal from the fixed anchor point 114. After receiving the signal from fixed anchor point the mobile device 2 104 checks the accuracy of its location history log, and in one embodiment, if the location information corresponding to the mobile device 2 104 in the location history log is within a predetermined level of accuracy, the mobile device 2 104 transmits its location history log 310 to the first mobile device 1 102. In at least some embodiments the location history log includes location related information including at least one of: i) information indicating the location of the mobile communications device 2 104 at different points in time or ii) the result of signal measurements of signals received from other devices (e.g., from mobile devices 106, 108, 110 in this example) at each of said different points in time.

Thus the first mobile device 1 102 builds up and stores historical signal measurement information corresponding to signals received from mobile device 2 104 at different point in time, e.g., sent from mobile device 2 104 from location 1, location 2 and location 3. Using the stored signal measurement information corresponding to signals received from mobile device 2 104 and correlating it with the received location history log from the mobile device 2 104 and from one or more other devices, the first mobile device 1 102 is able to determine a fairly accurate estimate of the first mobile device's path over time. Further, the first mobile device's current location estimate may also be generated and refined even though an anchor point is not in the vicinity of the first mobile device 1 102. It should be further appreciated that using the location history log received from the second mobile device 2 104 and the stored signal measurement information, the first mobile device 1 102 may compute the relative location and the path of various other devices in the system as well. Thus using the received location history log and the stored signal measurement information the first mobile device 1 102 may even generate estimated location history records for one or more other devices in the system indicating where said one or more devices were at various different points in time.

Figure 4:
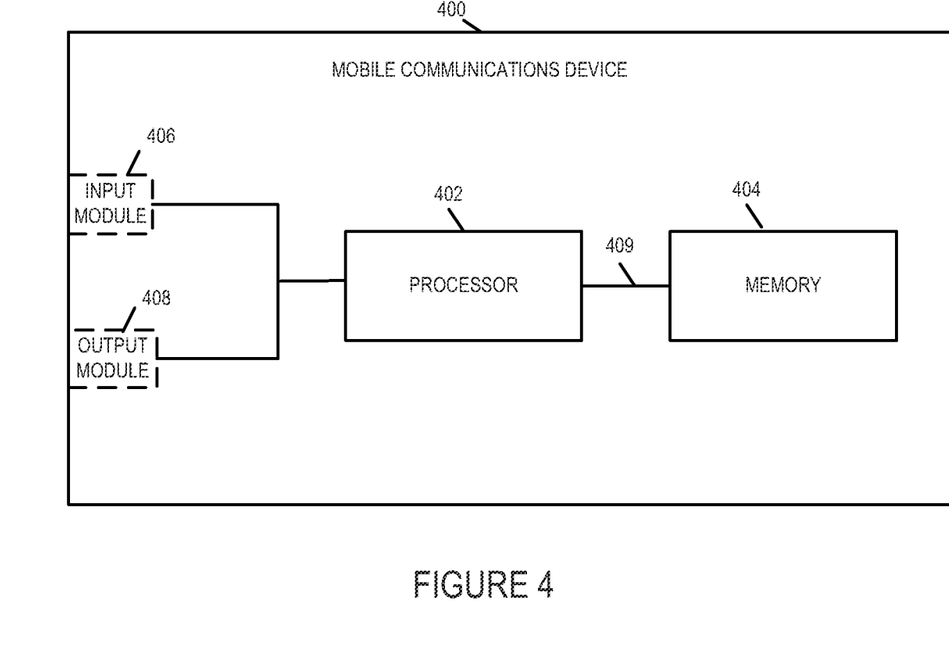
FIG. 4 is an exemplary mobile communications device in accordance with an exemplary embodiment.

FIG. 4 is a drawing of an exemplary mobile communications device 400, in accordance with an exemplary embodiment. Exemplary mobile communications device 400 may be used as any one of the wireless mobile communications devices of FIG. 1 such as the first mobile communications device 1 102. Exemplary mobile communications device 400 may, and sometimes does, implement a method in accordance with flowchart 200 of FIG. 2.

The mobile communications device 400 includes a processor 402 and memory 404 coupled together via a bus 409 over which the various elements (402, 404) may interchange data and information. The memory 404 may include an assembly of modules used to control the mobile communications device, e.g., such as the assembly of modules shown in FIG. 5. The mobile communications device 400 further includes an input module 406 and an output module 408 which may be coupled to processor 402 as shown. However, in some embodiments, the input module 406 and output module 408 are located internal to the processor 402. Input module 406 can receive input signals. Input module 406 can, and in some embodiments does, include a wireless receiver and/or a wired or optical input interface for receiving input. Output module 408 may include, and in some embodiments does include, a wireless transmitter and/or a wired or optical output interface for transmitting output.

Processor 402 is configured to receive a location history log from a second mobile communications device including location related information corresponding to at least one point in time, said location related information including at least one of: i) information indicating the location of the second mobile communications device at said at least one point in time or ii) the result of signal measurements of signals received from other devices at said at least one point in time; and determine information about the location of the mobile communications device 400 from the received location history log and stored signal measurement information corresponding to signals received from the second mobile communications device. In some embodiments the determined information about the location of the mobile communications device 400 includes information about at least one of the current location of the mobile communications device 400, or a past location of the mobile communications device 400.

In various embodiments the processor 402 is configured to perform the following, prior to determining information about the location of the mobile communications device 400: receive signals from the second mobile communications device, measure signals received from the second mobile communications device; and store signal measurement information and time information in association with information identifying the second mobile communications device as the source of the measured signals. In some embodiments the location history log is sent in a single transmission from the second mobile communications device. In some embodiments transmission of the location history log is a broadcast transmission from the second mobile communications device, not addressed to a specific mobile communications device.

Processor 402 in some embodiments is further configured to receive a signal from a fixed location anchor point, generate a location estimate based on the signal received from the fixed anchor point, and determine a refined estimate of the current location of the mobile communications device 400, said refined estimate being based on the location estimate generated from the signal received from a fixed anchor point in addition to the received location history log.

Processor 402 in various embodiments is further configured to update internally stored location history information indicating a path of the mobile communications device 400 over a period of time, and broadcast a mobile communications device location history log including location related information corresponding to at least one point in time, said location related information including at least one of: i) information indicating the location of the mobile communications device 400 at said at least one point in time or ii) the result of signal measurement of a signal received by the mobile communications device 400 from another device at said at least one point in time. In some embodiments the processor 402 is configured to transmit the mobile communications device location history log after determining the location history of the first mobile communications device to a predetermined level of accuracy.

Figure 5:
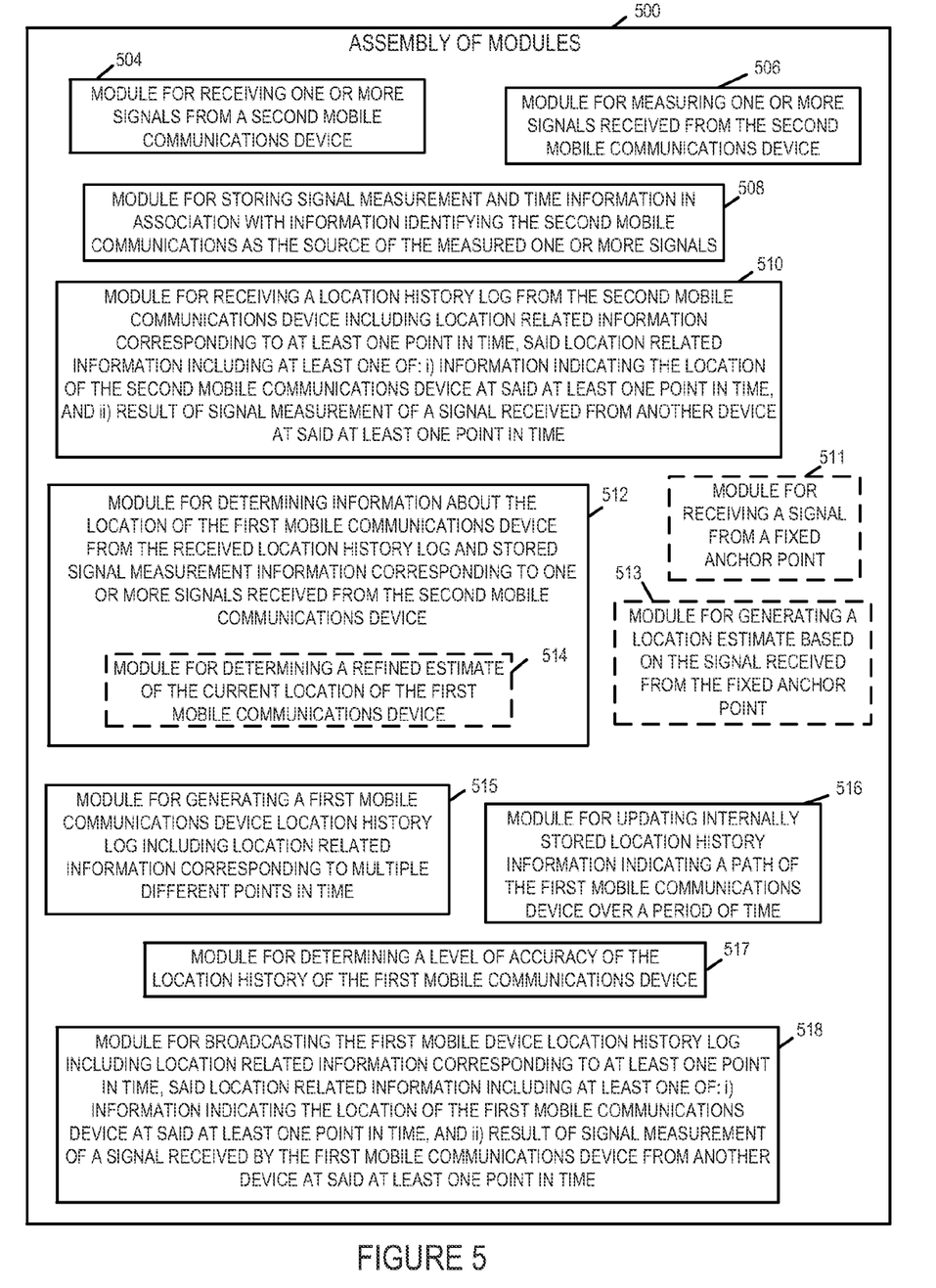
FIG. 5 is an assembly of modules which may be used in the exemplary mobile communications device of FIG. 5.

FIG. 5 illustrates an assembly of modules 500 which can, and in some embodiments is, used in a first mobile communications device such as the mobile communications device 400 illustrated in FIG. 4. The modules in the assembly 500 can be implemented in hardware within the processor 402 of FIG. 4, e.g., as individual circuits. Alternatively, the modules may be implemented in software and stored in the memory 404 of the mobile communications device 400 shown in FIG. 4. While shown in the FIG. 4 embodiment as a single processor, e.g., computer, it should be appreciated that the processor 402 may be implemented as one or more processors, e.g., computers. When implemented in software the modules include code, which when executed by the processor, configure the processor, e.g., computer, 402 to implement the function corresponding to the module. In some embodiments, processor 402 is configured to implement each of the modules of the assembly of modules 500. In embodiments where the assembly of modules 500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the wireless mobile communications device 400 or elements therein such as the processor 402, to perform the functions of the corresponding steps illustrated and/or described in the method of flowchart 200 of FIG. 2.

The assembly of modules 500 includes a module corresponding to each step of the method of flowchart 400 shown in FIG. 4. For example module 504 corresponds to step 204 and is responsible for performing the operation described with regard to step 204. The assembly of modules 500 includes a module 504 for receiving signals from a second mobile communications device, e.g., device 2 104, a module 506 for measuring signals received from the second mobile communications device, a module 508 storing signal measurement information and time information in association with information identifying the second mobile communications device as the source of the measured signals, a module 508 for receiving a location history log from the second mobile communications device including location related information corresponding to at least one point in time, said location related information including at least one of: i) information indicating the location of the second mobile communications device at said at least one point in time or ii) the result of signal measurements of signals received from other devices at said at least one point in time; and a module 510 for determining information about the location of the mobile communications device 400 from the received location history log and stored signal measurement information corresponding to signals received from the second mobile communications device. In some embodiments the determined information about the location of the mobile communications device 400 includes information about at least one of the current location of the mobile communications device 400, and a past location of the mobile communications device 400.

In various embodiments the assembly of modules 500 further includes a module 511 for receiving a signal from a fixed anchor point, a module 513 for generating a location estimate based on the signal received from the fixed anchor point. In some embodiments the determining module 512 further includes a module 514 for determining a refined estimate of the current location of the mobile communications device 400, said refined estimate being based on the location estimate generated from the signal received from a fixed anchor point in addition to the received location history log. Thus in various embodiments the module 514 for determining the refined estimate receives an input from module 513 for use in determining the refined estimate.

Assembly of modules 500 in some embodiments further includes a module 515 for generating a first mobile communications device location history log including locations related information corresponding to at least one point in time, a module 516 for updating internally stored location history information indicating a path of the first mobile communications device 400 over a period of time, and a module 517 for determining a level of accuracy of the location history of the first mobile communications device 400, and a module 518 for broadcasting the first mobile communications device location history log including location related information corresponding to at least one point in time, said location related information including at least one of: i) information indicating the location of the mobile communications device 400 at said at least one point in time or ii) the result of signal measurements of signal(s) received by the mobile communications device 400 from other devices at said at least one point in time. In some embodiments the first mobile communications device location history log is transmitted after determining the location history of the first mobile communications device to a predetermined level of accuracy.

FIG. 6 illustrates an exemplary location history log 600 including location related information, which is received from a second mobile communications device such as device 2 104. The first mobile communications device 1 102 (400) may, and in some embodiments does, store the received location history log received from the second mobile communications device, e.g., in the device memory. As discussed the received location history log 600 is used by the first mobile device 1 102 in various embodiments to determine information about the location of the mobile communications device 1 102. In some embodiments the location history log 600 is sent in a single transmission from the second mobile communications device. In some embodiments transmission of the location history log 600 is a broadcast transmission from the second mobile communications device 2 104, not addressed to a specific mobile communications device.

The exemplary location history log 600 includes location related information corresponding to multiple different points in time, the location related information including at least one of: i) information indicating the location of the second mobile communications device at each of said multiple different points in time, e.g., as shown in row 602, or ii) the result of signal measurements of signals received from other devices at each of said multiple different points in time, e.g., as shown in rows 604 to 608.

As shown, row 602 includes information indicating the location of the second mobile communications device, identified by the device identifier 2 in column 650, at each of the multiple different points in time. In some embodiments information about the accuracy of the indicated location of the second mobile communications device 104 is also included in the log 600 corresponding to each point in time for which location measurement information is stored. In some embodiments such an accuracy indicator is a probability value such as P1, P2, and P3 shown in row 602. For example in row 602, Location 1 indicates the location of the second mobile device 2 104, time T1 indicates the time at which the second mobile device 2 104 was at location 1, and P1 is the probability value indicating how accurate the determined location 1 is, according to the second mobile device transmitting the log 600. Location 2 indicates the location of the second mobile device 2 104 at time T2 and P2 is the probability value indicating the accuracy of the determined location 2; and Location x indicates the location of the second mobile device 2 104 at time Tk with P3 representing the probability value indicating the accuracy of the determined location x. Thus the location, time and optionally the probability information corresponding to the second mobile device 2 104, included in row 602, represents the location history of the second mobile device 2 104 over a period of time.

A plurality of signal measurements corresponding to multiple devices identified by the device identifiers, are included in rows 604 to 608. In accordance with one aspect of some embodiments, the second mobile communications device store signal measurements corresponding to signals received by the second mobile device 2 104 from other devices in combination with a device identifier identifying the mobile device to which the signal measurement information corresponds and a time stamp indicating the time of signal measurement. This stored signal measurement information corresponding to signals received from various devices, e.g., over a period of time, is included the location history log in some embodiments.

Each of the rows 604, 606, ..., 608 correspond to an individual mobile communications device identified by the device identifiers shown by each individual entry in column 650. The signal measurement information and the time stamps indicating the time of the corresponding signal measurement, corresponding to each of the device identifiers is also indicated.

As shown, row 604 corresponds to a mobile communication device identified by device identifier 3, and a plurality of signal measurements performed on one or more signals received from the mobile device to which the device identifier 3 corresponds, are indicated in the same row along with the time stamp. For example in row 604, measurement 1 indicates the measured signal characteristic, e.g., signal power level, of a signal received from the device identified by the device identifier 3 and T1 indicates the time of measurement 1. Measurement 2 in row 604 indicates the signal measurement information corresponding to, e.g., another peer discovery signal, received from the same mobile device having device identifier 3 at different time indicated by T2. Measurement k in row 604 indicates the signal measurement information corresponding to yet another peer discovery signal received from the same mobile device having device Identifier 3, at a time indicated by Tk. Similarly other rows 606, 608 include signal measurement and time information corresponding to various devices identified by the device identifiers such as Device Identifier 4, . . . , and Device Identifier n.

Figure 7:
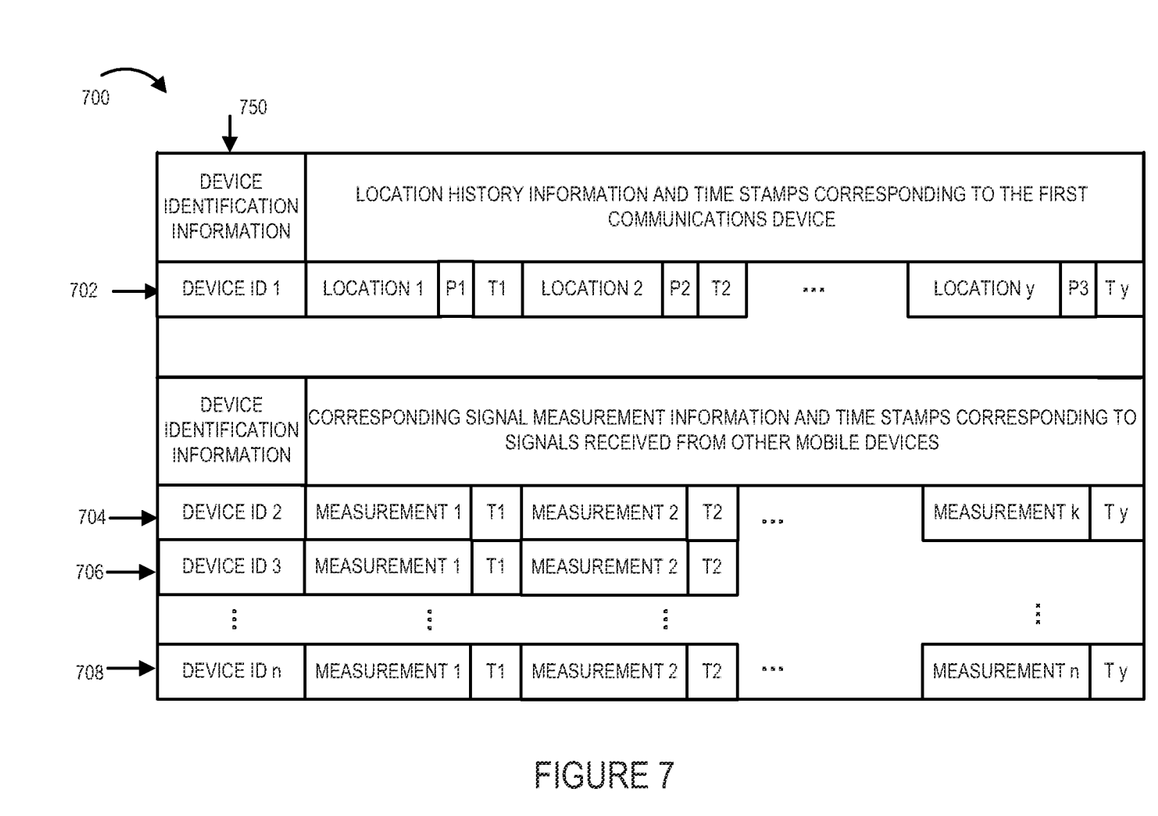
FIG. 7 illustrates an exemplary location history log corresponding to the first mobile communications device which is internally stored and maintained by the first mobile communications device, in accordance with one exemplary embodiment.

FIG. 7 illustrates an exemplary first mobile communications device's location history log 700 including location related information, which is internally maintained and stored by an exemplary first communications device, e.g., device 400 (102). The first mobile communications device 1 102 may store the location history log 700, e.g., in the device memory 404. In the exemplary embodiment of FIG. 7, the location history log 700 includes location related information corresponding to one or more, e.g., multiple different points in time, the location related information including at least one of: i) information indicating the location of the first mobile communications device 400 at each of said multiple different points in time, e.g., as shown in row 702, or ii) the result of signal measurements of signals received from other devices at each of said multiple different points in time, e.g., as shown in rows 704 to 708.

As shown, row 702 includes information indicating a determined location of the first mobile communications device 400 (102), identified by the device identifier in column 750, at each of the multiple different points in time. In some embodiments information about the accuracy of the location information indicating the determined location of the first mobile device 1 102 may also be stored for each point in time for which location information is stored. Thus stored location history information shown in row 702 in some embodiments, indicates a path of the first mobile communications device over a period of time. In some embodiments, each of the determined location at different points in time is determined, e.g., using the received location history log from a mobile communications device, e.g., such as location history log 600 from the second mobile communications device 2 104, and the stored signal measurement information corresponding to signals received from that mobile communications device. In some embodiments the determined location at different points in time is determined using other information, e.g., using signal(s) received from fixed anchor points, using fingerprint prediction maps. In some embodiments the first mobile device 400 updates the location history information, e.g., after generating refined location estimates using received signal(s) from which location information can be determined more reliably, such as signal received from fixed location anchor points.

Location 1 in row 702 indicates the location of the first mobile device 1 102, time T1 indicates the time at which the first mobile device 1 102 was at location 1, and P1 is the probability value indicating how accurate the determined location 1 is, according to the first mobile device 1 102 that determines said location. Location 2 indicates the location of the first mobile device 1 102 at time T2, and P2 is the probability value indicating the accuracy of the determined location 2. Location y indicates the location of the first mobile device 1 102 at time Ty while P3 indicates the probability value indicating the accuracy of the determined location y. Thus the information corresponding to the first mobile device, included in row 702, represents the location history of the first mobile device 1 102 over a period of time.

A plurality of signal measurements corresponding to multiple devices identified by the device identifiers, are included in rows 704 to 708. As discussed, the first mobile communications device store signal measurements corresponding to signals received by the first mobile device 1 102 from other devices, in combination with a device identifier identifying the mobile device to which the signal measurement information corresponds and a time stamp indicating the time of signal measurement. This stored signal measurement information corresponding to signals received from various devices, e.g., over a period of time, is included the location history log in some embodiments.

Each of the rows 704, 706, . . . , 708 correspond to an individual mobile communications device identified by the device identifiers shown by each individual entry in column 750. The signal measurement information and the time stamps indicating the time of the corresponding signal measurement, corresponding to each of the device identifiers is also indicated.

Row 704 corresponds to a mobile communication device identified by device identifier 2, e.g., mobile communications device 2 104, and a plurality of signal measurements performed on one or more signals received from the mobile device to which the device identifier 2 corresponds, are indicated in the same row along with the time stamp. Measurement 1 in row 704 indicates the measured signal characteristic, e.g., signal power level, of a signal received from the device identified by the device identifier 2 and T1 indicates the time of measurement 1. Measurement 2 in row 704 indicates the signal measurement information corresponding to, e.g., another peer discovery signal, received from the same mobile device having device identifier 2 at different time indicated by T2. Measurement k in row 704 indicates the signal measurement information corresponding to yet another peer discovery signal received from the same mobile device at a time indicated by Ty. Similarly other rows 706, 708 include signal measurement and time information corresponding to various devices identified by the device identifiers such as Device Identifier 3, . . . , and Device Identifier n.

In accordance with one aspect of some embodiments the location history log 700 corresponding to the first mobile communications device 1 102, is transmitted, e.g., broadcast, after determining the location history of the first mobile communications device to a predetermined level of accuracy. Thus in some embodiments the first mobile communications device 1 102 transmits its location history log 700 after determining that its determined location is reasonably accurate, so that other devices in the system receiving the location history log 700 may use it in determining their own location.

In various embodiments a mobile communications device, e.g., communications device 400 of FIG. 4, includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software. In various embodiments a mobile device measures the fingerprints, e.g., power or other signal characteristic of signals received from other mobile devices that are also trying to determine their position. The signals transmitted by the other mobile devices may be signals that are typically transmitted by mobile devices under normal network operation, such as peer-discovery signals, traffic, paging and timing signals, or they may be dedicated positioning or broadcast signals.

In one embodiment a first mobile device measures at least one signal characteristic of the signals transmitted by a second mobile device which may not know its current or past locations. When the second mobile device obtains an estimate of its own location history, which consists of past locations with the associated time-stamps, it either broadcasts this location history or directly transmits the information to the first mobile device. The first mobile device then computes its current and/or past locations based on the sequence of past signal measurements corresponding to the signals transmitted by the second mobile device, and the received location history information of the second mobile device. In calculating its current or past locations, the first mobile device may use a set of fingerprint prediction maps corresponding to each of the past locations of the second mobile device.

In yet another embodiment, the location history of the second mobile device is sent by an anchor point to the first mobile device. This may occur if the network devices are kept informed about the locations of the second mobile device, e.g., either by direct communication with the second mobile device or by passively tracking its position. The network devices such as the anchor point, might send this information to the first mobile device in response to a request for location history information from the first mobile device.

The fingerprint prediction maps may come from ray-tracing software, standard models, autonomous or mobile-directed map learning, or a combination of the above. The time-stamps may be relative to a local notion of time shared by all the mobiles. In some embodiments the first mobile device may limit the tracking of signals of mobile devices to devices that have indicated that they are attempting to, or have succeeded in, determining their location and are willing to share their location history with other mobile devices in the system. Such an indication may be transmitted by a peer discovery signal.

The mobile communications devices providing their location history information may be viewed as mobile anchor points. Hence, one benefit of the exemplary methods discussed here is that the effective number of devices used for location determination would increase over time, yielding improved accuracy and latency of positioning for the mobile devices in an area.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, storing, measuring, processing, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more above discussed methods.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first mobile communications device, comprising:
   receiving a location history log from a second mobile communications device including location related information corresponding to at least one point in time, said location related information including at least one of: i) information indicating the location of the second mobile communications device at said at least one point in time or ii) the result of a signal measurement of a signal received from another device at said at least one point in time; and
   determining information about the location of the first mobile communications device from the received location history log and stored signal measurement information corresponding to one or more signals received from the second mobile communications device, said determined information including a refined estimate of the current location of the first mobile communications device, said refined estimate being based on a location estimate generated from a signal received from a fixed anchor point in addition to said received location history log, said determined information indicating at least one of the current location of the first mobile communications device or a past location of the first mobile communications device; and
   updating internally stored location history information indicating a path corresponding to movement of the first mobile communications device over a period of time.

2. The method of claim 1, wherein said location history log is sent in a single transmission from the second mobile communications device.

3. The method of claim 1, further comprising, prior to said step of determining information about the location for the first mobile communications device:
   measuring signals from the second mobile communications device; and
   storing signal measurement and time information in association with information identifying the second mobile communications device as the source of the measured signals.

4. The method of claim 1, further comprising:
   broadcasting a first mobile communications device location history log including location related information corresponding to at least one point in time, said location related information including at least one of: i) information indicating the location of the first mobile communications device at said at least one point in time or ii) the result of signal measurement of a signal received by the first mobile communications device from another device at said at least one point in time.

5. The method of claim 4, wherein said first mobile communications device location history log is transmitted after determining the location history of the first mobile communications device to a predetermined level of accuracy.

6. A first mobile communications device, comprising:
   means for receiving a location history log from a second mobile communications device including location related information corresponding to at least one point in time, said location related information including at least one of: i) information indicating the location of the second mobile communications device at said at least one point in time or ii) the result of signal measurement of a signal received from another device at said at least one point in time; and
   means for determining information about the location of the first mobile communications device from the received location history log and stored signal measurement information corresponding to signals received from the second mobile communications device, said means for determining information about the location of the first mobile communications device including means for determining a refined estimate of the current location of the first mobile communications device, said refined estimate being based on a location estimate generated from a signal received from a fixed anchor point in addition to said received location history log, said determined information indicating at least one of the current location of the first mobile communications device or a past location of the first mobile communications device; and
   means for updating internally stored location history information indicating a path corresponding to movement of the first mobile communications device over a period of time.

7. The first mobile communications device of claim 6, further comprising:
   means for measuring signals from the second mobile communications device; and
   means for storing signal measurement and time information in association with information identifying the second mobile communications device as the source of the measured signals.

8. The first mobile communications device of claim 6, further comprising:
   means for broadcasting a first mobile communications device location history log including location related information corresponding to at least one point in time, said location related information including at least one of: i) information indicating the location of the first mobile communications device at said at least one point in time or ii) the result of signal measurement of a signal received by the first mobile communications device from another device at said at least one point in time.

9. A first mobile communications device, comprising:
   at least one processor configured to:
      receive a location history log from a second mobile communications device including location related information corresponding to at least one point in time, said location related information including at least one of: i) information indicating the location of the second mobile communications device at said at least one point in time or ii) the result of signal measurement of a signal received from another device at said at least one point in time; and determine information about the location of the first mobile communications device from the received location history log and stored signal measurement information corresponding to signals received from the second mobile communications device, said determined information including a refined estimate of the current location of the first mobile communications device, said refined estimate being based on a location estimate generated from a signal received from a fixed anchor point in addition to said received location history log, said determined information indicating at least one of the current location of the first mobile communications device or a past location of the first mobile communications device; and update internally stored location history information indicating a path corresponding to movement of the first mobile communications device over a period of time; and memory coupled to said at least one processor.

10. The first mobile communications device of claim 9, said at least one processor is further configured to:

measure signals from the second mobile communications device; and store signal measurement and time information in association with information identifying the second mobile communications device as the source of the measured signals.

11. The first mobile communications device of claim 9, said at least one processor is further configured to:

broadcast a first mobile communications device location history log including location related information corresponding to at least one point in time, said location related information including at least one of: i) information indicating the location of the first mobile communications device at said at least one point in time or ii) the result of signal measurement of a signal received by the first mobile communications device from another device at said at least one point in time.

12. A computer program product for use in a first mobile communications device, comprising:

non-transitory computer readable medium comprising:

code for causing at least one computer to receive a location history log from a second mobile communications device including location related information corresponding to at least one point in time, said location related information including at least one of: i) information indicating the location of the second mobile communications device at said at least one point in time or ii) the result of signal measurement of a signal received from another device at said at least one point in time; and code for causing said at least one computer to determine information about the location of the first mobile communications device from the received location history log and stored signal measurement information corresponding to signals received from the second mobile communications device, said determined information including a refined estimate of the current location of the first mobile communications device, said refined estimate being based on a location estimate generated from a signal received from a fixed anchor point in addition to said received location history log, said determined information indicating at least one of the current location of the first mobile communications device or a past location of the first mobile communications device; and code for causing said at least one computer to update internally stored location history information indicating a path corresponding to movement of the first mobile communications device over a period of time.

13. The method of claim 1, wherein the determined information about the location of the first mobile communications device includes a past location of the first mobile communications device.

14. The method of claim 1, wherein the determined information about the location of the first mobile communications device includes both a current location of the first mobile communications device and a past location of the first mobile communications device.

* * * * *